United States Patent
Siebers et al.

(10) Patent No.: US 8,192,163 B2
(45) Date of Patent: Jun. 5, 2012

(54) WIPER FOR WIND TURBINE BLADES

(75) Inventors: Thomas Siebers, Neuenkirchen (DE); Rainer Arelt, Ellingen (DE)

(73) Assignee: General Electric Company, Schenectady, NY (US)

( * ) Notice: Subject to any disclaimer, the term of this patent is extended or adjusted under 35 U.S.C. 154(b) by 969 days.

(21) Appl. No.: 12/167,453

(22) Filed: Jul. 3, 2008

(65) Prior Publication Data
US 2010/0003138 A1    Jan. 7, 2010

(51) Int. Cl.
*F01D 25/00* (2006.01)
*F01D 5/14* (2006.01)

(52) U.S. Cl. .............................. 416/146 R; 416/223 R

(58) Field of Classification Search .............. 416/146 R, 416/123 R, 1, 229 R, 214 R, 248; 15/245, 15/256.5, 118
See application file for complete search history.

(56) References Cited

U.S. PATENT DOCUMENTS
2009/0297352 A1 * 12/2009 Walter ...................... 416/223 R

OTHER PUBLICATIONS

Insects Cause Double Stall, Gustave P. Corten and herman F. Veldkamp, paper EWEC 2001, Copenhagen.
Power Performance of Active Stall Wind Turbines with Blade Contamination, C.J. Spruce, paper EWEC 2006, Athens.
www.bugwiper.com/www.storka.at.
www.hkavionic.com.

* cited by examiner

*Primary Examiner* — A. Sefer
*Assistant Examiner* — Nikolay Yushin
(74) *Attorney, Agent, or Firm* — Global Patent Operation; Douglas D. Zhang

(57) ABSTRACT

The present patent application concerns an apparatus for cleaning an outer surface of a rotor blade of a wind turbine, the apparatus comprising a first frame and a cleaning device, the cleaning device being adapted to conform to the outer surface and connected to the first frame, wherein the apparatus is adapted to be slidably positioned on the outer surface of the rotor blade, to slide along, and to be pressed onto the outer surface. Further, it concerns an apparatus for cleaning a leading edge of a rotor blade of a wind turbine, the apparatus comprising a first frame and a cleaning device, the cleaning device being adapted to conform to the leading edge and being connected to the first frame, wherein the apparatus is adapted to be slidably positioned on the leading edge of the rotor blade, to slide along and to be pressed onto the leading edge during standstill of a wind rotor comprising the rotor blade. Finally, it concerns a rotor blade of a wind turbine comprising an apparatus for cleaning a leading edge of the rotor blade, wherein the apparatus is mounted on said rotor blade, the apparatus comprising a first frame and a cleaning device, the cleaning device being adapted to conform to the leading edge and being attached to the first frame, wherein the apparatus is adapted to be slidably positioned on the leading edge of the rotor blade, to slide along and to be pressed onto the leading edge during rotation of a wind rotor comprising the rotor blade.

23 Claims, 6 Drawing Sheets

WIPER FOR WIND TURBINE BLADES

BACKGROUND OF THE INVENTION

The present disclosure relates to an apparatus for cleaning a leading edge of a rotor blade of a wind turbine. Further it relates to a rotor blade of a wind turbine comprising an apparatus for cleaning a leading edge of the rotor blade Modern wind turbines operate rotor blades at tip speeds of up to 80 m/s (i.e. more than 150 mph or more than 250 km/h). During operation, dirt accumulates on a blade surface mainly at and close to a leading edge of the rotor blade. The accumulation of dirt on the blade surface results in increased surface roughness which changes the aerodynamical characteristics of the blade. On one hand, a maximum lift of the rotor blades decreases which leads to lower performance of the wind turbine. For example, the maximum power level for stall controlled turbines may, drop as much as 45%. Hence, power production is decreased.

Further, an angle of attack at maximum lift decreases due to dirt accumulation on the blade surface, which results in a larger probability of stalling the blade. The angle of attack is the angle between an airfoil chord and a free-stream velocity of the airflow. For a pitch controlled turbine, blade stall will not only decreases energy capture but also leads to an unnormal operation condition that potentially endangers the turbine safety at the moment of flow re-attachment.

Additionally, flying bugs that collide with the rotor blade may cause blade fouling. The bug bloom is affected by several parameters such as temperature, humidity and also wind speed. Typically, bugs can only fly up to wind turbine rotor height during low wind speeds (e.g. less than 10 m/s).

BRIEF DESCRIPTION OF THE INVENTION

In view of the above, an apparatus for cleaning an outer surface of a rotor blade of a wind turbine is provided, wherein the apparatus includes a first frame and a cleaning device, the cleaning device being adapted to conform to the outer surface and being connected to the first frame, wherein the apparatus is adapted to be slidably positioned on the outer surface of the rotor blade, to slide along, and to be pressed onto the outer surface.

According to a further aspect, an apparatus for cleaning a leading edge of a rotor blade of a wind turbine is provided, the apparatus comprising a first frame and a cleaning device, the cleaning device being adapted to conform to the leading edge and being connected to the first frame, wherein the apparatus is adapted to be slidably positioned on the leading edge of the rotor blade, to slide along, and to be pressed onto the leading edge during standstill of a wind rotor comprising the rotor blade.

According to another aspect a rotor blade of a wind turbine is provided comprising an apparatus for cleaning a leading edge of the rotor blade, wherein the apparatus is mounted on said rotor blade, the apparatus comprising a first frame and a cleaning device, the cleaning device being adapted to conform to the leading edge and being attached to the first frame, wherein the apparatus is adapted to be slidably positioned on the leading edge of the rotor blade, to slide along and to be pressed onto the leading edge during rotation of a Wind rotor comprising the rotor blade.

Further aspects, advantages and features are apparent from the dependent claims, the description and the accompanying drawings.

BRIEF DESCRIPTION OF THE DRAWINGS

A full and enabling disclosure, including the best mode thereof, to one of ordinary, skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in the figures. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

Figure 1:
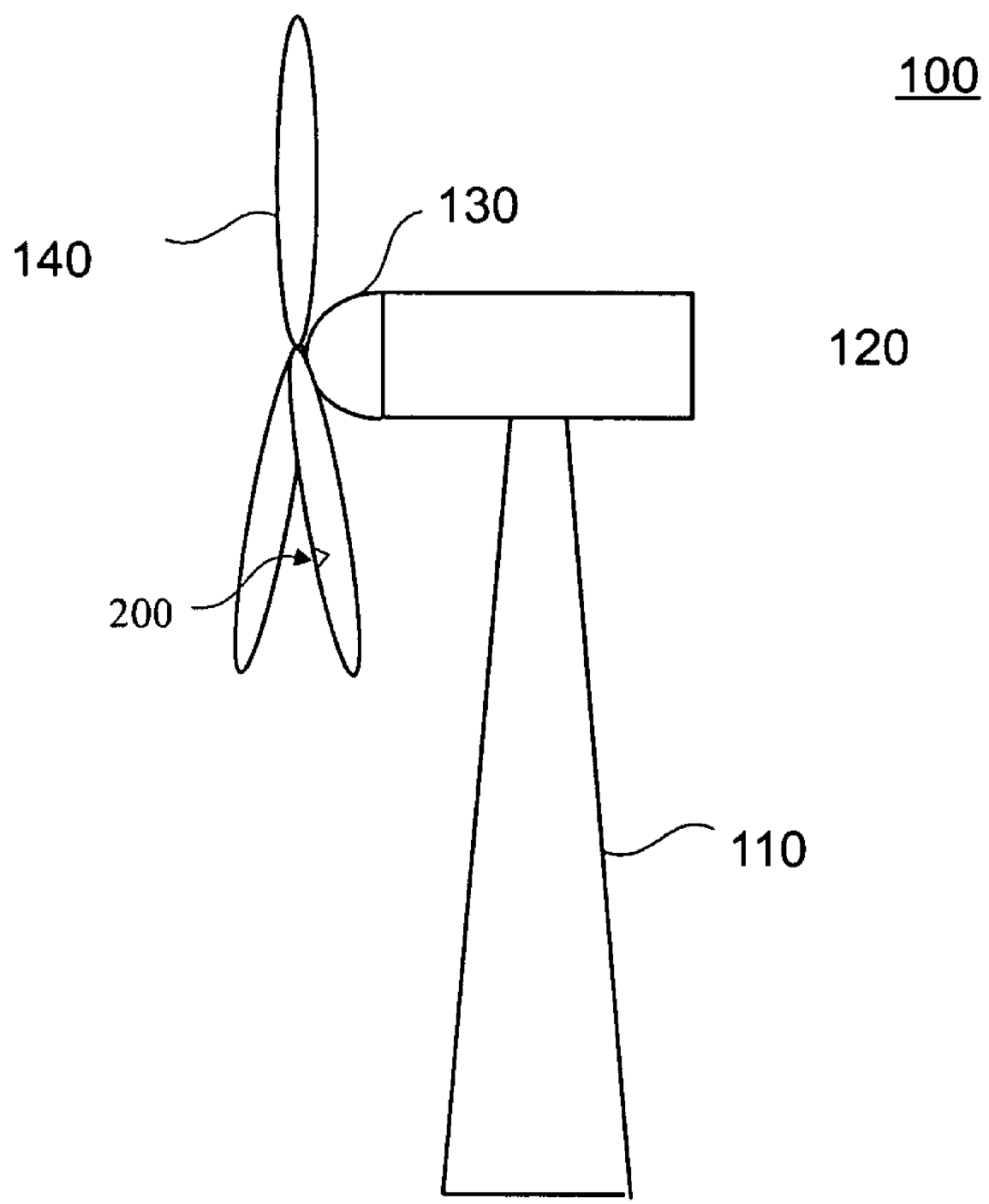
FIG. 1 shows a schematical drawing of a wind turbine.

FIG. 1 shows a wind turbine 100. The wind turbine 100 includes a tower 110 on which a nacelle 120 is mounted. The nacelle 120 is rotatable about a vertical axis of the tower. Within the nacelle 120 a generator (not shown) for transforming rotational energy into electrical energy is placed. The generator is connected to a hub 130 that is rotatable about a horizontal axis. Three rotor blades 140 are connected to the hub 130. The rotor blades 140 and the hub 130 together form a wind rotor of the wind turbine 100. The wind turbine 100 operates as follows. In a typical situation, the nacelle 120 is rotated about the vertical axis such that the horizontal axis of the hub 130 is substantially parallel to a wind direction. The wind exerts a torque on the wind rotor due to an aerodynamical profile of the rotor blades 140. Accordingly, the wind rotor is rotating about its horizontal axis, thus driving the generator. The generator transforms the mechanical rotation into electric current. Hence, the kinetic energy of the wind is transformed into electric energy.

During the operation of the wind turbine 100, e.g. during warn seasons, bugs may accumulate on a leading edge of the blade 140 of the wind turbine 100. Typically, the dirt accumulation occurs mainly in an outer portion of the rotor blade 140. The outer portion may be an outer third of the rotor blade 140. "Outer" and "inner" portions of a blade or "proximal" and "distal" are defined in this patent application with respect to the hub 130 in case the rotor blade is mounted on the hub, in particular with respect to the horizontal rotation axis of the hub 130. The accumulation of dirt mainly in an outer portion is due to an absolute speed of the outer portion of the rotor blade 140 that is much higher in the absolute speed at the inner portion of the rotor blade 140 near the hub 130.

Figure 2:
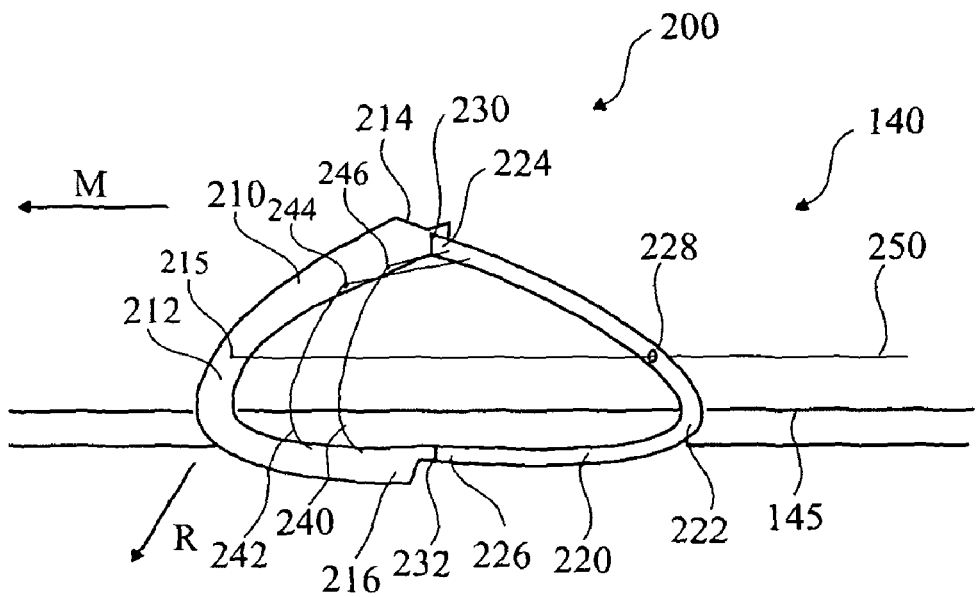
FIG. 2 shows a schematical drawing of a cleaning apparatus on a wind turbine blade.
Figure 3:
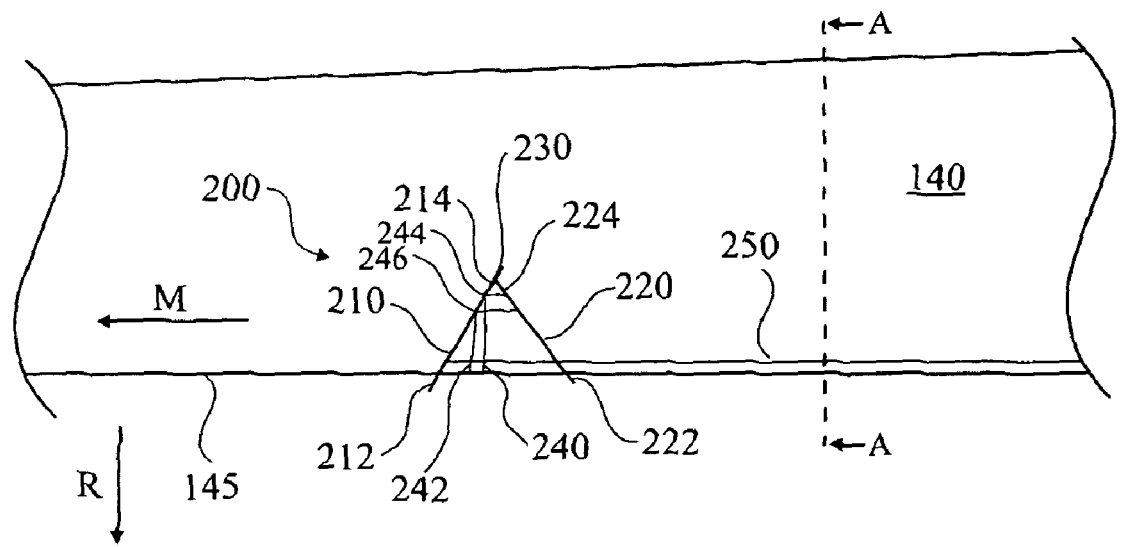
FIG. 3 shows a schematical top view of the cleaning apparatus on the wind turbine blade of FIG. 2.
Figure 4:
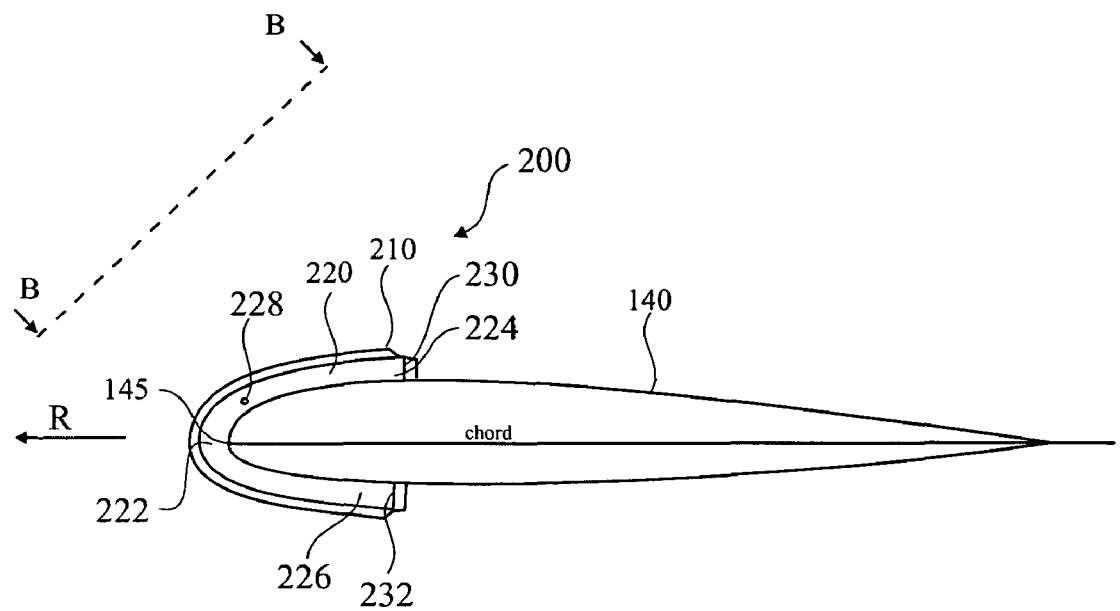
FIG. 4 shows a schematical side view of a profiled blade with the cleaning apparatus of FIG. 3.

FIG. 2 shows in a perspective view a portion of a rotor blade 140 with its leading edge 145 and a cleaning apparatus 200. FIG. 3 shows a respective top view of the portion of the rotor blade 140 with the cleaning apparatus 200. FIG. 4 is a respective side view of the rotor blade of the section A-A of FIG. 3. Further in FIG. 4 the view of FIG. 2 is depicted schematically as B-B. The hub 130, not shown in FIG. 2, or the inner portion of the rotor blade 140 is arranged on the right of the depicted portion of the rotor blade 140. Therefore, the outer portion of the rotor blade 140 is arranged on the left of the depicted portion. The wind rotor of the wind turbine is rotating in direction R. The cleaning apparatus 200 is arranged on the leading edge 145 of the rotor blade 140. The cleaning apparatus includes two bow-shaped frames 210, 220 conforming around the leading edge 145, namely a driving frame 210 and a tension frame 220. The driving frame 210 and the tension frame 220 have respective leading ends 212, 222 and two rear ends 214, 224 and 216, 226, respectively. Rear end and leading end of the cleaning device is defined according to their orientation with respect to the leading edge 145 of the rotor blade 140. A first rear end 214, 224 of the frames 210, 220 is arranged on the leeward side (suction side) of the rotor blade 140 during operation of the wind turbine 100 and a second rear end 216, 226 of the frames 210, 220 is arranged on the windward side (pressure side) of the rotor blade 140 during operation of the wind turbine 100. The driving frame 210 and the tension frame 220 are connected with each other by hinges 230, 232 at their rear ends 214, 224, 216, 226 on the windward side and on the leeward side of the rotor blade 140, respectively. In one embodiment, the spring is realized as a torsion spring adapted to push the driving frame 210 and the tension frame 220 away from each other. In other words, the hinges 230, 232 and springs are the same elements. In a further embodiment, a separate spring is associated to the hinges 230, 232 to push the driving frame 210 and the tension frame 220 away from each other. In another embodiment, only the rear ends on one side of the rotor blade 140, either the windward side or the leeward side of the rotor blade 140, are connected by a spring to push the driving frame 210 away from the tension frame 220. The driving frame 210 and the tension frame 220 may enclose an angle of about 60 degree to 120 degrees, in particular 80 to 100 degrees, in a typical embodiment of about 90 degrees.

As shown in FIG. 2 and FIG. 3, two cleaning wires 240, 242 are connected to the driving frame 210 on the windward side and on the leeward side, respectively. They may be connected to the driving frame 210 approximately in the middle between the leading end 212 and the rear ends 214, 216. In another embodiment, the cleaning wires 240, 242 may be connected close to the rear ends 214, 216 of the driving frame. In further embodiments, also one, three or more cleaning wires may be used. The cleaning wires 240, 242 span about the leading edge 145 of the rotor blade 140, in the case of a plurality of cleaning shires in a typical embodiment in spaced apart relationship on the leading edge 145 of the rotor blade 140. For example, cleaning wires may be nylon shires, but may also include other suitable materials, e.g. perlon wires, steel spires etc. In a typical embodiment, the cleaning wires 240, 242 are redirected, e.g. by a pulley 244, 246 or a pin, from the driving frame 210 to the tension frame 220, where ends of the cleaning wires are fixed. Thus, in the deployed configuration the cleaning wires 240, 242 are tensioned, in particular due to the spring forces of the spring, e.g. the torsion spring, pushing the driving frame 210 and the tension frame 220 away from each other. In a further embodiment, both ends of the cleaning wires 240, 242 are redirected from the driving frame 210 to the tension frame 220. It should be understood by those skilled in the art that a cleaning device according to the embodiments described herein are very lightweight. Furthermore, due to their low profile the cleaning devices affect the aerodynamical properties of the blades only slightly or even not at all.

The cleaning apparatus 200 may be passively or actively moved from a proximal portion to a distal portion of the rotor blade 140 along the leading edge 145 in a longitudinal direction M and back from the distal portion to the proximal portion of the rotor blade 140.

In an embodiment, the cleaning apparatus 200 is moved passively from the proximal portion to the distal portion by the wind. This embodiment is shown in FIGS. 2, 3 and 4. The proximal end of the rotor blade is arranged in the FIG. 3 right to the cleaning apparatus 200 and the distal end on the left of the cleaning apparatus 200. FIG. 4 shows a side view of the cleaning apparatus 200 in the longitudinal direction M, i.e. from the proximal end to the distal end of the rotor blade 140. The driving frame 210 has a substantially flat surface forming a driving blade for driving the cleaning device in the longitudinal direction M. Therefore, the surface of the driving frame 210 is adapted and/or disposed such that an air flow, in particular due to the rotation of the wind rotor that is substantially opposite to the rotating direction R, exerts a force in the longitudinal direction M on the driving frame and thus on the cleaning apparatus 200.

In case the tension frame 220 has also a flat surface perpendicular to a surface of the rotor blade 140, such that a force is created in opposite direction to the longitudinal direction M, i.e. in a proximal direction, the surfaces of the tension frame 200 and the driving frame 210 are adapted such that an air flow impinging on the surfaces creates a resulting force in the longitudinal direction M. For example, the surface of the driving frame 210 may be greater than the surface of the tension frame. The flat surface of the tension frame 220 may further tension the cleaning wires 240, 242.

Typically, the air flow presses the cleaning device on the leading edge 145 of the rotor blade 140 due to the surface of the tension frame 220 and/or the surface of the driving frame 210.

Figure 5:
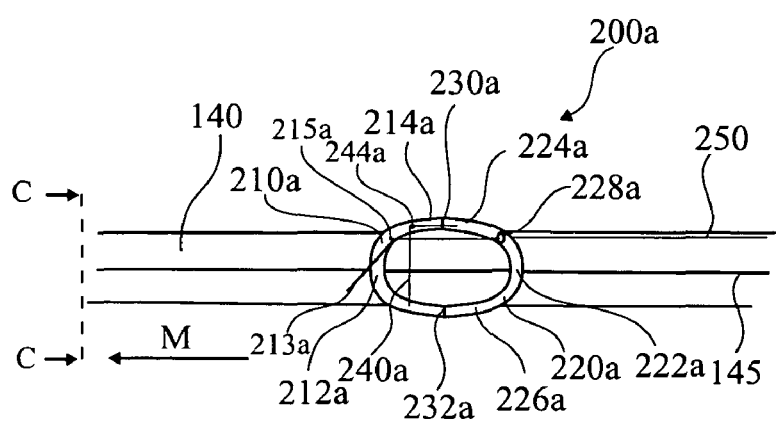
FIG. 5 shows a schematical front view of a cleaning apparatus according another embodiment.
Figure 6:
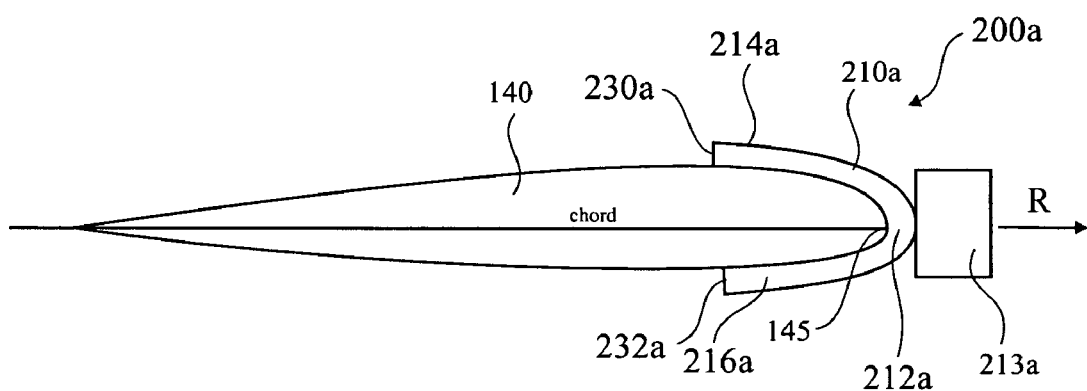
FIG. 6 shows a schematical side view of a cleaning apparatus according to the embodiment of FIG. 5.

In a further embodiment of a passively moved cleaning apparatus 200a, the cleaning apparatus 200a may include an additional driving blade 213a that is mounted at the leading end 212a of the driving frame 210a. FIGS. 5 and 6 show such a cleaning apparatus in a front view (FIG. 5) and in a side view in direction from the distal end to the proximal end of the rotor blade 140 (Section C-C of FIG. 5). The driving blade 213a may have a surface normal that is oblique to the leading edge 145 of the rotor blade 140. Therefore, the surface of the driving blade 213a is adapted such that an air flow, in particular the wind to the leeward side of the rotor blade 140 during stand still of the wind rotor, exerts a force in the longitudinal direction M on the driving blade 213a and thus on the cleaning apparatus 200a.

In the case of the cleaning apparatus 200, 200a shown in FIGS. 2, 3, 4 and 5, a driving blade of the cleaning apparatus 200, 200a is arranged such that the cleaning apparatus 200, 200a is driven in the longitudinal direction M. The air flow may depend on the rotational speed of the wind rotor. Therefore the optimal configuration of the driving blade may depend on the wind speed and the rotational speed of the wind turbine.

Thus, only driven by the wind or by the air flow, the cleaning apparatus 200 will move along the leading edge 145 of the rotor blade 140 in the longitudinal direction M, and the cleaning wires 240, 240a, 242 will peel off dirt accumulated on the leading edge 145.

When the cleaning apparatus 200, 200a according to FIGS. 2 to 6 has reached a final position, for example near the blade tip of rotor blade 140, it may be retracted. This may be enabled by a retraction wire 250 that is connected at an attachment point 215, 215a to the driving frame 210, 210a, typically close to the leading end 212, 212a. In a further embodiment, the retraction wire 250 is connected on the leeward side of the rotor blade 140 close to the leading end 212, 212a at an attachment point to the driving frame 210. For guiding the retraction wire 250, the tension frame 220, 220a includes a guiding aperture 228, 228a.

The cleaning apparatus 200, 200a shown in FIGS. 2 to 6 is in a deployed configuration. In a folded configuration, the driving frame 210, 210a and the tension frame 220, 220a are arranged substantially in parallel. In the folded configuration, the cleaning wires 240, 242, 240a are not tightened around the leading edge of the rotor blade. In a typical embodiment, the guiding aperture 228, 228a and the attachment point 215, 215a cover each other in the folded configuration. When the cleaning apparatus 200 is retracted, the cleaning apparatus may be first brought from the deployed configuration to the folded configuration by pulling on the retraction wire. Then, the air stream acting in the driving blade 210, 210a may push the cleaning apparatus from the outer portion to the inner portion of the rotor blade 140. In a further embodiment, the cleaning apparatus 200, 200a is retracted in the deployed configuration. It depends on the elastic force of the spring at the hinge 230, 230a, 232, 232a whether the cleaning apparatus 200, 200a is retracted in the deployed configuration or in the folded configuration.

Figure 7:
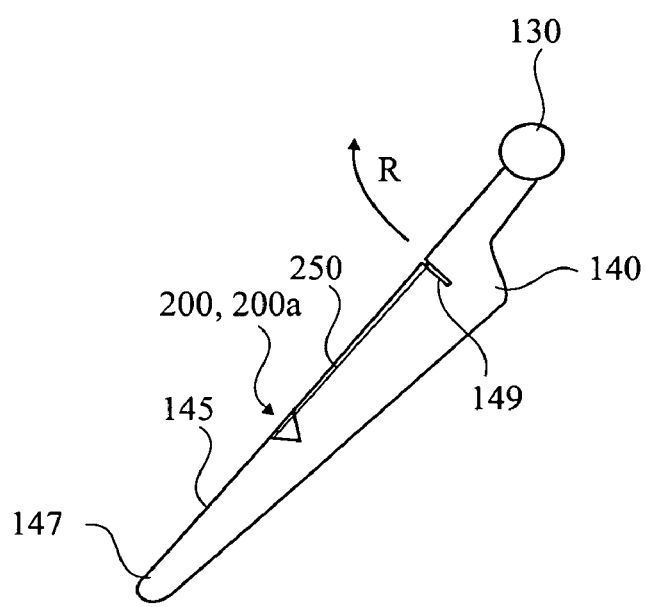
FIG. 7 shows a schematical drawing of a cleaning apparatus on a rotor blade.

FIG. 7 depicts the rotor blade 140 with the cleaning apparatus 200, 200a. The rotor blade 140 has a blade tip 147 and a leading edge 145. The cleaning apparatus 200, 200a is first deployed in a starting position at the inner or proximal portion of the rotor blade 140 and then moved along the leading edge 145 of the rotor blade 140 to an end position near the blade tip 147. As already described above, when the cleaning device is retracted by the retraction wire 250 the cleaning apparatus 200, 200a may be first brought from the deployed configuration into the folded configuration, so that the air flow does not further drive the cleaning device into the longitudinal direction M. The folded cleaning device may be, in a tropical embodiment, brought back into a shelter 149. For example, the shelter may define the starting position. In the shelter 149, the cleaning apparatus 200, 200a is typically kept in the folded configuration and not exposed to the air flow. In case the cleaning apparatus 200, 200a is retracted in the deployed configuration, it may be drawn against a stopper in the shelter 149, so that the cleaning apparatus 200, 200a is brought from the deployed configuration to the folded configuration in the shelter 149.

In one embodiment, a motor for manipulating the retraction wire 250 may, be also located in the shelter 149. The shelter may be located in an inner portion, in particular in the inner third, of the rotor blade 140, so that the deteriorating aerodynamical effects of the shelter 149 are minimized. Thus, during normal operation of the wind turbine 100, the cleaning device will be parked in the shelter 149 on the leading edge 145 of the rotor blade 140, in particular at an inner location of the profiled section of the blade. The frames 210, 210a, 220, 220a of the cleaning apparatus 200, 200a are folded in parallel and pulled tight against the inner contour or stopper of the shelter, where the device will be held safely an without exposure to the air flow. The parallel folding also enables also a slender design of the shelter, which minimizes additional drag. Thus for cleaning of the leading edge 145 of the rotor blade 140, the cleaning apparatus 200 is released from the shelter by loosening the retrieval or retraction wire 250. In a typical embodiment, the spring at the hinges 230, 230a, 232, 232a will unfold the cleaning device in its deployed configuration and expose the driving blade 215a or the distal or driving frame 210 to the air flow. As the driving frame 210 of the cleaning apparatus 200, 200a is aerodynamically shaped, the air pressure during turbine operation keeps the cleaning apparatus 200 attached to the leading edge 145 of the rotor blade 140, and drives the cleaning apparatus 200, 200a distally towards the blade tip 147. As already described here above, the device will be pulled out along the leading edge 145 all the way to the blade tip 147 and unspool the retraction wire 250. Shortly before the blade tip 147, the cleaning apparatus 200 will be stopped by the retraction wire 250 and then winched back in to the resting or starting position in the shelter 149. The entire cleaning process will only take a few minutes, during which it might be necessary to change the operational parameters of the turbine in order to optimize the air flow around the rotor blade 140 for optimum cleaning results.

Figure 8:
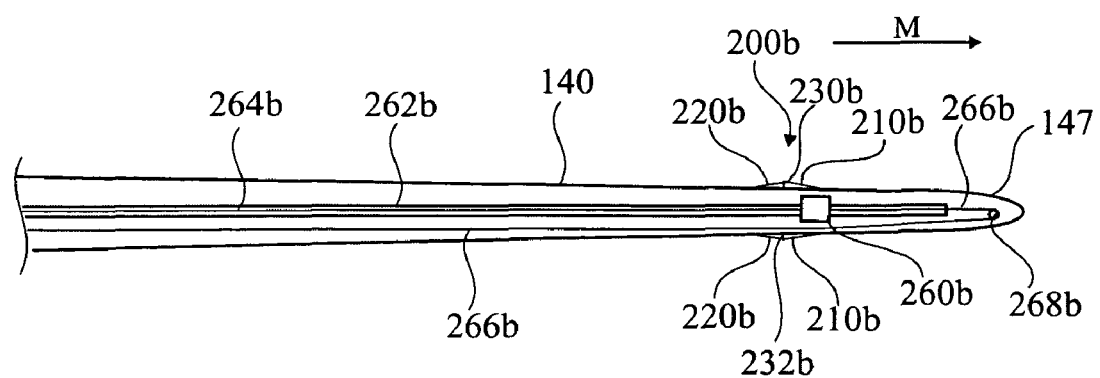
FIG. 8 shows a cross-sectional view of a wind turbine blade with a cleaning apparatus according to a further embodiment.

In the following, a further embodiment is described with respect to FIG. 8. FIG. 8 shows a section view of a rotor blade 140 from the backward direction. The same reference numbers refer to the same objects as in the previous drawings. A cleaning apparatus 200b of FIG. 8 attached to the rotor blade 140 has substantially the same configuration as the cleaning apparatus 200 or 200a shown in FIG. 2 or FIG. 5. The cleaning apparatus 200b includes a driving frame 210b and a tension frame 220b that are connected at their respective rear ends with hinges 230b, 232b. Inside the blade 140, on the inner side of the leading edge, a retaining device 260b is positioned approximately at the same distance to the hub 130 as the leading end of the driving frame 210b. The retaining device 260b is attracting the driving frame 210b by magnetic forces or the like to the leading edge 145 of the rotor blade 140. Therefore, the cleaning apparatus 200b may not able to fall of the rotor blade in any situation. In a further embodiment a second retaining device might be positioned to attract the tension frame 220b to the leading edge of the blade and to assure that cleaning wires are tensioned. The tensioning of the cleaning wires may be regulated by the distance between the retaining device 260b and the second retaining device. In a typical embodiment, the retaining device is guided by a rail 262b disposed on the inner side of the leading edge of the blade 140. Therefore, the inner component of the cleaning device may be movable within the leading edge 145 of the rotor blade 140.

As in the embodiments described with respect to FIG. 2 to FIG. 6, the cleaning apparatus 200b is pushed by an air flow or by a centrifugal force in case of rotation of the wind rotor in direction of the blade tip 147. The retaining device 260b follows the driving frame 210b due to the magnetic attraction forces in the longitudinal direction. When the cleaning apparatus 200b has reached a final position near the blade tip 147, the cleaning apparatus 200b has to be retracted to a starting position. This may be done in the same manner as described with respect to FIG. 7. In a further embodiment, the retaining device 260b is connected to a retraction wire 264b that is used to retract the retaining device to its starting position. As the retaining device attracts the driving frame 210b to the leading edge, and the leading end of the driving frame 210b follows the retaining device 260b, also the driving frame 210b is retracted to its starting position. The cleaning apparatus 200b may be altered in the folded configuration, when the cleaning apparatus 200b is retracted to its starting position. If a guiding rail is used, larger cleaning forces than in the embodiment shown in FIG. 2 are possible, so that the cleaning apparatus 200b is also suitable for cleaning if icing occurs.

In a further embodiment, the driving frame 210b is not primarily driven by an air flow in direction of the blade tip 147. In this embodiment the cleaning apparatus 200b is actively driven from the proximal portion of the rotor blade to the distal portion of the rotor blade. Inside the blade 140, the retaining device 260b is connected to a driving wire 266b, that may pull the retaining device 260b in the longitudinal direction M. A winch for pulling the driving wire 266b may be located in the blade tip 147, or if a driving wire pulley 268b is located in the blade tip 147 it may be disposed in the inner portion, in particular in the inner third, of the blade 140. In an embodiment the winch for the driving wire 266b may disposed close to the winch for the retraction wire 264b. Thus, with a driving mechanism that is located inside the blade, which is therefore not disturbing the aerodynamical properties of the blade 140, the cleaning apparatus 200b can be driven along the leading edge of the blade 140 independently of the operation of the wind turbine 100, i.e. if the wind rotor is rotating or not.

In the embodiments shown in FIG. 8, the cleaning apparatus 200b is guided from the inside of the blade 140. A carriage or retaining device is traveling along the leading edge on the inside, with the outside cleaning apparatus 200b only by magnetic forces. The magnets would pull the carriage or retaining device and the cleaning apparatus towards each other and thus hold both in place and assure sufficient stress on the cleaning wires. As the retrieval or retraction wire may be located on the inside of the blade, wind forces on the retrieval wire are avoided and tangling is prevented.

Figure 9:
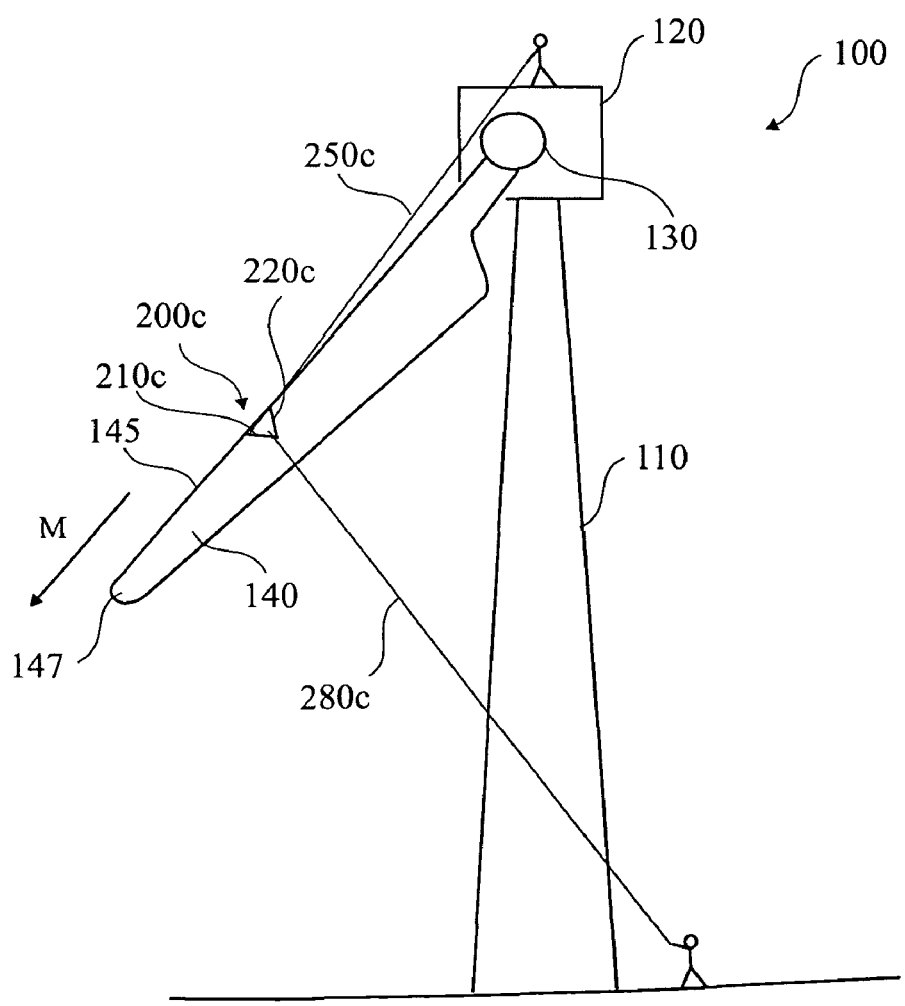
FIG. 9 shows a schematical drawing of a manual application of a cleaning apparatus according another embodiment.

In a further embodiment shown in FIG. 9, a cleaning apparatus 200c is provided. In this embodiment the cleaning apparatus 200c is also passively moved in the longitudinal direction M. The cleaning apparatus 200c has substantially the same parts as the embodiment of the cleaning apparatus 200 shown in FIG. 2, namely a driving frame 210c and a tension frame 220c. Before the cleaning is performed, the rotor blade 140 to clean is rotated approximately into a 7 o'clock position as shown in FIG. 9. Further, the rotor blade 140 may be pitched into a 0° position. Now the wind turbine 100 is in a park-position. The cleaning apparatus 200c is lowered, for example by a person on the nacelle or a winch located in the rotor blade 140 or a shelter 149 as shown in the embodiment of FIG. 7. The driving frame 210c may include weights, e.g. plumb weights, to support the driving of the cleaning apparatus 200c with gravity forces. When the cleaning apparatus 200c reaches the final position, for example near the rotor blade tip 147, the cleaning apparatus 200c is pulled back with a retraction wire 250c. This may be performed b, a winch or by a person as shown in FIG. 9. If additional pressure is needed, a pressing afire or rope 280c connected to the cleaning apparatus, either to the driving frame 210c or the tension frame 220c, or both to the driving frame 210c and the tension frame 220c. If the pressing wire 280c is drawn approximately perpendicular to the leading edge 145 of the rotor blade 140, an additional pressure of the cleaning wires on the leading edge 145 is build up, so that also persistent dirt may be removed from the leading edge 145. The pressing wire 280c may be pulled by a person on the ground.

In a further embodiment, the cleaning apparatus 200c of FIG. 9 may also be used during rotation of the wind rotor of the wind turbine. In this embodiment, the cleaning apparatus 200c is also passively moved in the longitudinal direction. The retraction wire 250c is connected to a winch in the rotor blade or a shelter like in the FIG. 7. The retraction wire 250c may be connected to the driving frame 210c or to the tension frame 220c. If the retraction wire 250c is connected to the tension frame 220c, the driving frame and the tension frame are pushed apart as described with respect of FIG. 2 width a spring until a stop limits the further movement. The force of the spring has to be selected such that the cleaning apparatus is not folded during the cleaning process, when it moves in the longitudinal direction M. Further, the leading end of the driving frame 210c may include a weight as already described. Further, the tension frame 220c and the driving frame 210c may be formed such that during operation the apparatus 200c is pressed onto the leading edge by an air stream during the rotation of the wind rotor. This may in a further embodiment also or additionally be achieved by a retaining device located inside the rotor blade 140 as described with respect to FIG. 8. Therefore, during rotation of the wind rotor, the cleaning apparatus 200c, in particular the driving frame 210c is pulled into the longitudinal direction M by centrifugal forces. The retraction wire 250c holds the cleaning apparatus, and the cleaning apparatus 200c is slowly slacked off by the winch in direction of the blade tip 147, whereas the winch is connected to a proximal end of the retraction wire 250c. If the cleaning apparatus reaches an outermost position near the blade tip 147 it is retracted back in particular into a shelter, by the wink. During the rotation the relative wind or air stream imparting on the tension frame 220c and the driving frame 210c assures that the cleaning apparatus does not fell off the blade during a downward movement of the rotor blade 140.

The different embodiments of the present patent application may be combined like a kit of parts. Thus, the embodiment driven only by wind forces may be combined by the embodiment using gravitational or centrifugal forces. Or the embodiment using gravitational or centrifugal forces may be combined with an actively moving embodiment. The detailed design of the cleaning apparatus, in particular also a surface of the driving frame and the tension frame, may depend on the rotational speed of the wind rotor of the wind turbine and the wind conditions expected. Further it may depend if the cleaning may be performed during standstill of the wind rotor. In addition, the configuration of the cleaning device is such that already existing wind turbines may be retrofitted with such a device. Furthermore, it will be understood by those skilled in the art that the cleaning device may be provided in various shapes other than the ones shown in the accompanying drawings.

The present patent application discloses a mechanical apparatus, which is able to clean off the prominent dirt and thus significantly lower surface roughness at the leading edge. The cleaning device may, be activated directly after detection of a bug bloom or other dirt accumulation on the leading edge. The cleaning process will only take a few minutes. The impairment of turbine performance due to drag increase is minimal, if a shelter is located on the inboard half of the blade.

Figure 10:
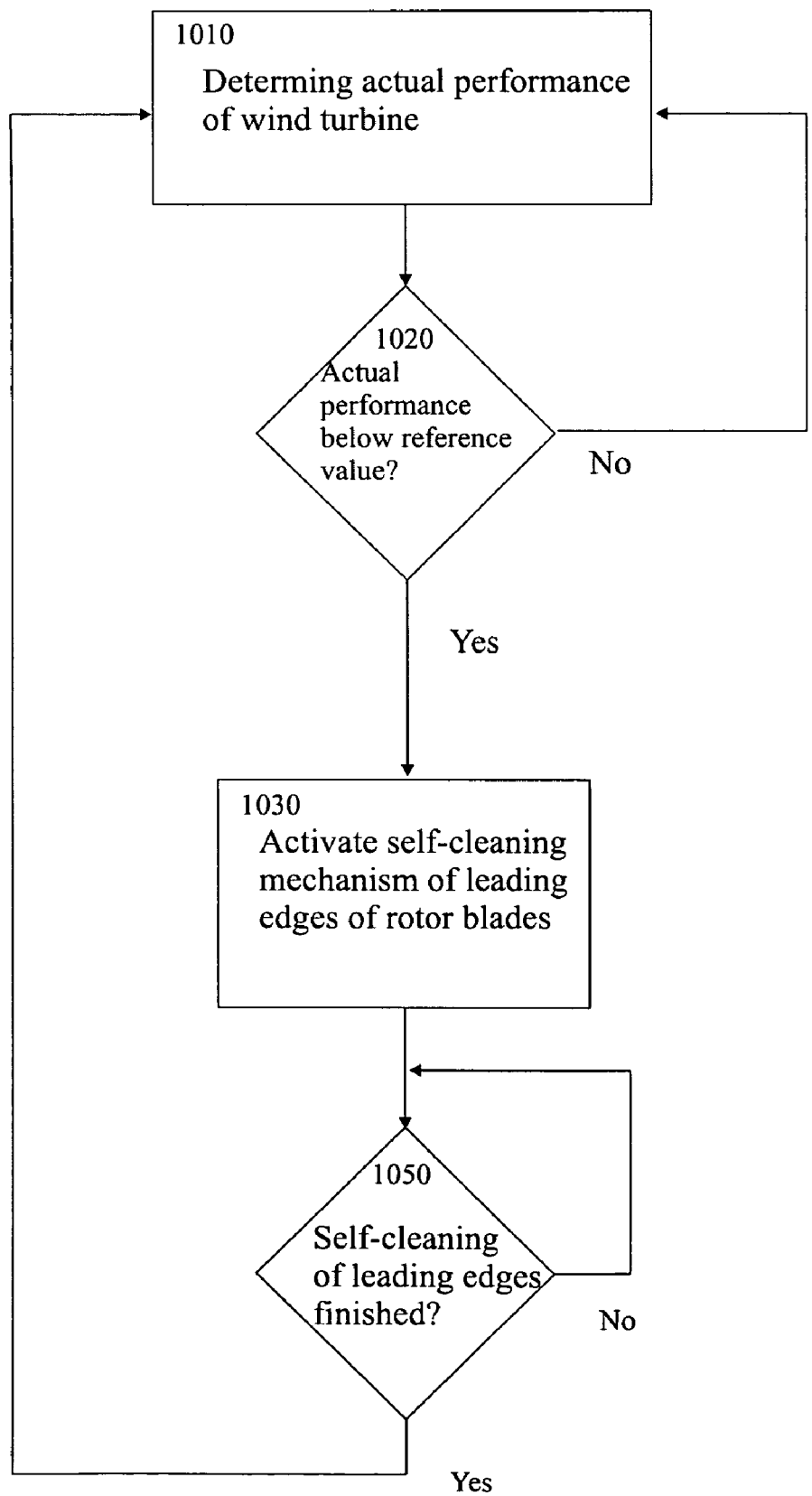
FIG. 10 shows a schematical process flow diagram of an embodiment of a method.

FIG. 10 shows a schematical process flow of an embodiment of the method according to the patent application. The method shown in FIG. 10 may only be activated if certain environmental conditions apply. For example if, in summer time, the probability of a bug bloom is very high or if the temperatures are below 2 degrees Celsius so that a risk of ice attachment on the leading edge of a wind turbine exists. If the method according to FIG. 10 is activated, a controller permanently monitors the efficiency which might be, e.g., the produced electrical power to wind force ratio (see step 1010). Also other methods for detecting a dirt accumulation on the rotor blade might be used. If the efficiency of the Wind turbine has dropped below a predetermined value that depends on the actual weather and wind conditions, the controller determines that a cleaning of the rotor blade due to dirt accumulation is needed (see step 1020). A self cleaning mechanism is activated in step 1030 to perform a cleaning operation of the leading edges of the rotor blades. This may be performed with a cleaning device according to one of the embodiments described here above. Further, the cleaning may be performed during operation of the Wind turbine, i.e. the wind rotor of the wind turbine is rotating. Thus, no valuable time and energy is lost, as the wind turbine has not to be stopped and started again after the cleaning operation in the last case. Therefore, the overall efficiency of the rewind turbine may be raised. If the cleaning of the rotor blade is finished (see step 1050), the controller starts monitoring the efficiency again.

The present patent application may further concern a method for automatically cleaning the rotor blades of a wind turbine comprising the steps: determining an actual performance of the wind turbine; comparing the determined performance With a reference value; activating a self-cleaning mechanism.

Further, the cleaning may be only activated, if the wind rotor is rotating at least at a specific rotational speed and or of the rotor blades have a specific pitch angle.

This written description uses examples to disclose an invention, including the best mode, and also to enable any person skilled in the art to practice this invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope is defined by the claims, and may include other examples that occur to those skilled in the art. Such other examples are intended to be within the scope of the claims of the have structural elements that do not differ from the literal language of the claims, or if they include equivalent structural elements with insubstantial differences from the literal languages of the claims.

What is claimed is:

1. An apparatus for cleaning an outer surface of a rotor blade of a wind turbine, the apparatus comprising:
   a first frame and a cleaning device, the cleaning device being conformable to the outer surface and connected to the first frame,
   wherein the apparatus is configured to be slidably positioned on the outer surface of the rotor blade and movable between (i) a deployed configuration where the apparatus is configured to slide along and be pressed onto the outer surface of the rotor blade, and (ii) a folded configuration where the apparatus is retractable into a recessed shelter defined in an inner portion of the rotor blade.

2. The apparatus according to claim 1, wherein the apparatus comprises a retraction wire comprising a first end connected to the apparatus and configured to extend from the first end in a proximal direction, and a second end connected to the wind turbine, wherein the retraction wire is configured to pull the apparatus in the proximal direction.

3. The apparatus according to claim 1, wherein the first frame comprises a surface that is orientated such that an air stream impinging on the surface during operation of the wind turbine presses the first frame onto a leading edge of the rotor blade.

4. The apparatus according to claim 1, wherein the first frame comprises a driving blade with a surface that is orientated such that an air stream impinging on the surface generates a force in a longitudinal direction of the rotor blade.

5. The apparatus according to claim 1, wherein the apparatus is configured to clean a leading edge of the rotor blade.

6. The apparatus according to claim 1, wherein the apparatus is configured to slide along and be pressed onto the outer surface of the rotor blade during rotation of the rotor blade.

7. The apparatus according to claim 1 wherein the apparatus traverses in and out of the shelter actively or passively to remove contaminants on the outer surface.

8. The apparatus according to claim 1, wherein the rotor blade comprises a leading edge, a windward side and a leeward side and the first frame is configured to encompass the leading edge, the first frame comprising a leading end in a direction of the leading edge of the rotor blade and two rear ends opposite the leading end, the two rear ends being configured to be arranged respectively on the windward side and on the leeward side of the rotor blade.

9. The apparatus according to claim 8, further comprising a second frame configured to encompass the leading edge of the rotor blade, the second frame comprising a leading end in the direction of the leading edge of the rotor blade and two rear ends opposite the leading end, the two rear ends being configured to be arranged respectively on the windward side and on the leeward side of the rotor blade, wherein the rear ends of the second frame are connected to the first frame.

10. The apparatus according to claim 9, wherein the second frame is configured to be arranged proximal to the first frame, and a retraction wire is connected to the second frame or to the first frame.

11. The apparatus according to claim 9, wherein the second frame is connected to the first frame with a hinge.

12. The apparatus according to claim 9, wherein the first frame comprises a weight at its leading end.

13. An apparatus for cleaning an outer surface of a rotor blade of a wind turbine, the apparatus comprising:
   a first frame;
   a cleaning device conformable to the outer surface of the rotor blade and connected to the first frame, the cleaning device and the first frame defining an outer component of the apparatus, the outer component being configured to be slidably placed on the outer surface of the rotor blade; and
   an inner component configured to be placed within the rotor blade,
   wherein the inner component is configured to draw the outer component onto a leading edge of the rotor blade by a magnetic force.

14. The apparatus according to claim 13, wherein the apparatus further comprises a driving wire comprising a first end connected to the apparatus and extendable from the first end in a longitudinal direction of the rotor blade, and a second end connected to the wind turbine, wherein the driving wire is configured to pull the apparatus in the longitudinal direction.

15. The apparatus according to claim 14, wherein the first end of the driving wire is configured to be connected to the inner component of the apparatus.

16. The apparatus according to claim 14, further comprising a pressing wire configured to draw the apparatus toward the leading edge of the rotor blade to increase pressure of the cleaning device on the leading edge when the rotor blade is standstill.

17. An apparatus for cleaning a leading edge of a rotor blade of a wind turbine, the apparatus comprising:
   a first frame and a cleaning device, the cleaning device being conformable to the leading edge and connected to the first frame,
   wherein the apparatus is configured to be slidably positioned on the leading edge of the rotor blade and movable between (i) a deployed configuration where the apparatus is configured to slide along and be pressed onto the leading edge during standstill or rotation of the rotor blade, and (ii) a folded configuration where the apparatus is retractable into a recessed shelter defined in an inner portion of the rotor blade.

18. The apparatus according to claim 17, wherein the first frame is configured to encompass the leading edge, the first frame comprising a leading end in a direction of the leading edge and two rear ends opposite the leading end, the two rear ends being configured to be arranged respectively on a windward side and on a leeward side of the rotor blade.

19. A rotor blade assembly of a wind turbine, comprising the apparatus of claim 17.

20. The rotor blade assembly according to claim 19, wherein the first frame comprises a surface that is orientated such that the relative wind impinging on the surface generates a force in a longitudinal direction of the rotor blade.

21. A rotor blade assembly of a wind turbine, comprising:
a rotor blade comprising a leading edge; and
an apparatus for cleaning the leading edge of the rotor blade, the apparatus comprising:
a first frame;
a cleaning device conformable to the leading edge of the rotor blade and attached to the first frame, the cleaning device and the first frame defining an outer component of the apparatus placed on an outer surface of the rotor blade; and
an inner component placed within the rotor blade;
wherein the inner component is configured to draw the outer component onto the leading edge of the rotor blade by a magnetic force, and the outer component is configured to slide along the leading edge of the rotor blade during rotation of the rotor blade.

22. The rotor blade assembly according to claim 21, further comprising a retrieval cable comprising one end connected to one of the outer component and the inner component of the apparatus for retrieving the apparatus to a starting position or into a recessed shelter defined in an inner portion of the rotor blade.

23. The rotor blade assembly of claim 22, wherein the cleaning device scrapes off ice or bugs from the leading edge of the rotor blade.

* * * * *

UNITED STATES PATENT AND TRADEMARK OFFICE
CERTIFICATE OF CORRECTION

PATENT NO. : 8,192,163 B2
APPLICATION NO. : 12/167453
DATED : June 5, 2012
INVENTOR(S) : Thomas Siebers et al.

It is certified that error appears in the above-identified patent and that said Letters Patent is hereby corrected as shown below:

In Column 1, Line 11, delete "surface" and insert -- surface, --, therefor.

In Column 1, Line 15, delete "decreases" and insert -- decreases, --, therefor.

In Column 1, Line 17, delete "may," and insert -- may --, therefor.

In Column 1, Line 57, delete "along" and insert -- along, --, therefor.

In Column 1, Line 58, delete "Wind" and insert -- wind --, therefor.

In Column 1, Line 67, delete "ordinary," and insert -- ordinary --, therefor.

In Column 2, Lines 27-28, delete "explanation" and insert -- explanation, --, therefor.

In Column 2, Line 53, delete "warn" and insert -- warm --, therefor.

In Column 3, Line 52, delete "shires" and insert -- wires --, therefor.

In Column 3, Line 54, delete "shires," and insert -- wires, --, therefor.

In Column 3, Line 55, delete "spires" and insert -- wires --, therefor.

In Column 5, Line 40, delete "tropical" and insert -- typical --, therefor.

In Column 5, Line 51, delete "may," and insert -- may --, therefor.

In Column 5, Line 64, delete "Thus" and insert -- Thus, --, therefor.

In Column 6, Lines 36-37, delete "embodiment" and insert -- embodiment, --, therefor.

In Column 7, Line 30, delete "embodiment" and insert -- embodiment, --, therefor.

In Column 7, Line 40, delete "park-position." and insert -- park position. --, therefor.

Signed and Sealed this
Twentieth Day of November, 2012

David J. Kappos
*Director of the United States Patent and Trademark Office*

CERTIFICATE OF CORRECTION (continued)
U.S. Pat. No. 8,192,163 B2

In Column 7, Line 48, delete "b," and insert -- by --, therefor.

In Column 7, Line 50, delete "afire" and insert -- wire --, therefor.

In Column 8, Line 1, delete "width" and insert -- with --, therefor.

In Column 8, Line 21, delete "back" and insert -- back, --, therefor.

In Column 8, Line 21, delete "wink." and insert -- winch. --, therefor.

In Column 8, Line 46, delete "may," and insert -- may --, therefor.

In Column 8, Line 63, delete "Wind" and insert -- wind --, therefor.

In Column 9, Line 5, delete "Wind" and insert -- wind --, therefor.

In Column 9, Line 9, delete "rewind" and insert -- wind --, therefor.

In Column 9, Line 16, delete "With" and insert -- with --, therefor.

In Column 9, Line 32, delete "the" and insert -- they --, therefor.

In Column 12, Line 18, in Claim 23, delete "claim 22," and insert -- claim 21, --, therefor.